July 10, 1934.    H. A. SCHAUER    1,965,670
APPARATUS FOR FORMING OR COINING METAL OBJECTS
Filed July 17, 1930
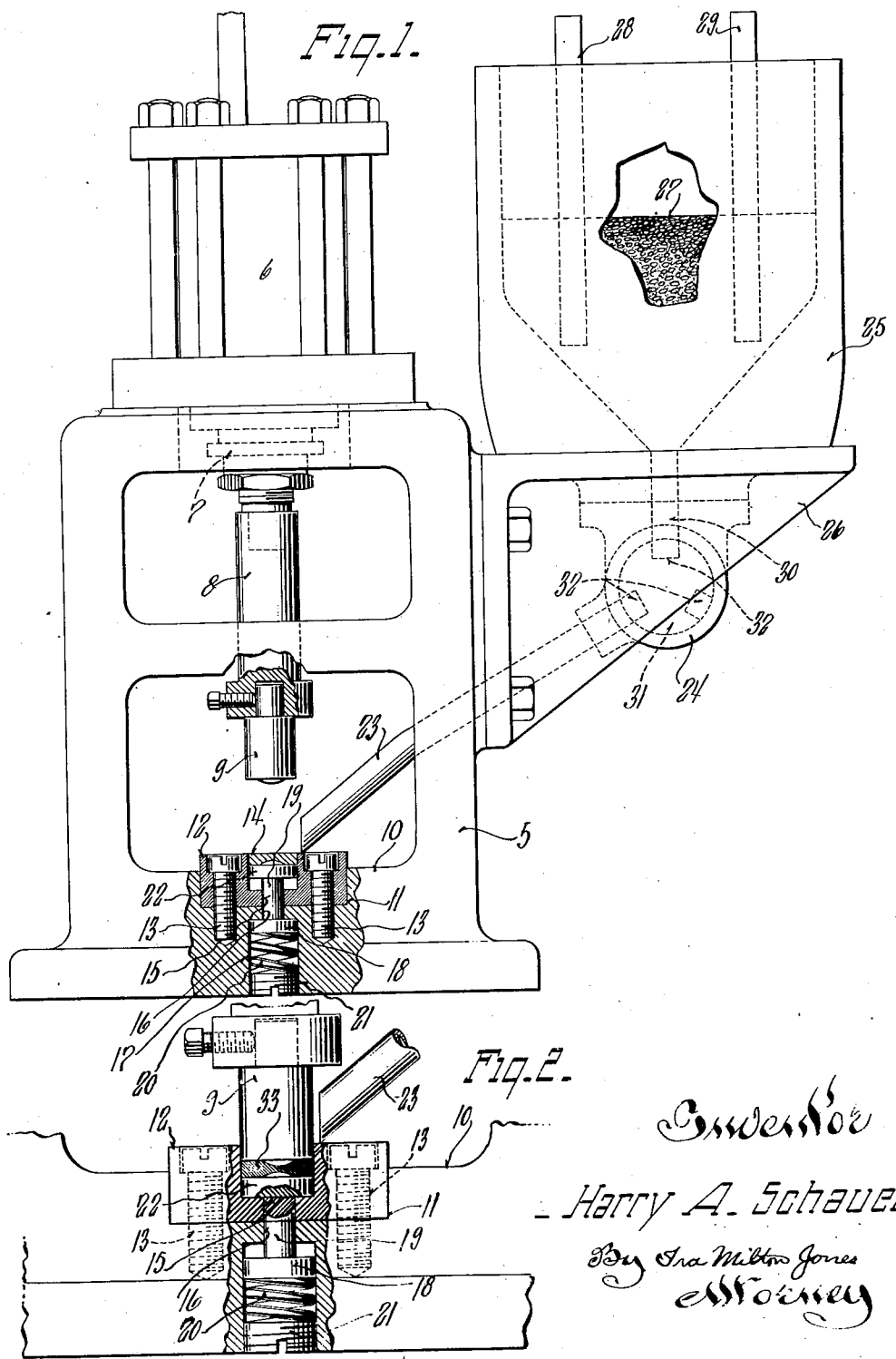

Patented July 10, 1934

1,965,670

UNITED STATES PATENT OFFICE 1,965,670

APPARATUS FOR FORMING OR COINING METAL OBJECTS

Harry A. Schauer, Wauwatosa, Wis.

Application July 17, 1930, Serial No. 468,527

2 Claims. (Cl. 78—13)

This invention relates to certain new and useful improvements in method of and apparatus for forming or coining metal objects such as small gate valves and the like which have heretofore been cast in the conventional manner.

In usual shop practice metal chips and the like are usually either discarded or sold as scrap and this invention, therefore, has as one of its objects a method of utilizing such metal chips, especially brass, to form or coin objects of various types and configurations.

Another object of this invention resides in a method of utilizing metal chips which consists in reducing them to a substantially plastic state and in conducting the plastic material to a form, mold, or die where it is pressed or formed into objects of any desired shape or contour.

A further object of this invention resides in the provision of an apparatus for forming metal objects from metal chips reduced to a plastic state to obviate the necessity of major machining operations.

And a still further object of this invention resides in the provision of an apparatus for use in coining or forming metal objects by pressure, in which a crucible or other furnace is directly connected with a forming press.

With the above and other objects in view which will appear as the description proceeds, my invention resides in the novel construction, combination and arrangement of parts substantially as hereinafter described and more particularly defined by the appended claims, it being understood that such changes in the precise embodiment of the hereindisclosed invention may be made as come within the scope of the claims.

In the accompanying drawing, I have illustrated one complete example of the physical embodiment of my invention constructed according to the best mode I have so far devised for the practical application of the principles thereof, and in which:

Figure 1 is a diagrammatic view illustrating a conventional forming press adapted with my invention, and Figure 2 is a fragmentary view illustrating the position of the parts of the press at the completion of the pressure stroke.

Referring now more particularly to the accompanying drawing, numeral 5 designates the frame of a conventional coining or forming press having a cylinder 6 and a ram 7 movable therein. Carried by the ram 7 is a movable die holder 8, to the lower end of which a movable die or mold section 9 is secured. The base 10 of the frame is recessed, as at 11, to receive a stationary die block 12 which is detachably secured therein by screws 13 or the like and with which the movable die 9 co-operates to form a predetermined object. In the present instance the dies 9 and 12 are designed to coin or form cylindrical discs.

The die block 12 has a central recess 14, the diameter of which is determined by the size of the disc to be formed and into which the die 9 is movable. The bottom of the recess 14 communicates with a central bore 15 of reduced diameter, which extends through the die block 12 and forms a continuation of a bore 16 formed in the base 10. The bottom of the bore 16 terminates in a counter-bore 17 in which the head or flange 18 of an ejector spindle 19 is positioned, and which is normally urged to its uppermost position illustrated in Figure 1, with the outer end of the ejector pin 19 projecting above the bottom of the recess 14, by an expansive spring 20 confined between the flange 18 and a plug 21 threaded in the outer end of the bore 17. Slidably received in the recess 14 and resting on the upper end of the ejector pin 19 is a lower die 22, the top of which, when the parts are in their normal position as illustrated in Figure 1, is spaced below the upper surface of the die block 12 a distance sufficient to form a reservoir with the walls of the recess, the capacity of which is equal to the volume of the disc to be formed.

The metal of which the discs are formed is conducted to the reservoir or recess 14 in any suitable manner, as through a tube 23, while in a plastic state, from a measuring device 24 in communication with a crucible or other suitable furnace 25. The crucible 25 is preferably mounted upon a bracket 26 secured to the frame of the press and is adapted to receive a quantity of chips 27 into which electrodes 28 and 29 extend to be electrically connected through the chips, whereby the passage of electrical energy from one electrode to the other produces sufficient heat to reduce the chips to a plastic state.

The plastic metal flows through an outlet opening 30 in communication with the lower end of the crucible, to the measuring device 24 which may consist of a rotatable disc 31 having pockets 32, of a capacity to measure off the desired quantity of material, in its outer periphery and which are successively aligned with the outlet 30 and then with the tube 23 to discharge their contents, as will be readily apparent.

Deoxidation of the chips while being heated may be accomplished in any of a plurality of ways, such for example, as introducing a flux into the retort 25 or in maintaining a deoxidizing atmosphere therein.

The quantity of material conducted to the reservoir formed in the upper end of the recess 14 fills it, substantially flush with the top of the die block 12. The press is then actuated to move the movable die 9 into the recess 14, which forces the metal therein and the lower die 22 downwardly against the action of the spring 20 until the lower die reaches the bottom of the recess 14. At this time the actual forming blow or pressure takes place, and after the proper degree of pressure has been applied the movable die is again raised, permitting the lower die to be returned to its original position by the spring 20, ejecting the finished disc 33 out of the recess. Inasmuch as the movable die 9 and the lower die 22 are readily removable it will be obvious that any shape of die may be used, and that any practical object may be molded in the manner hereinbefore described.

From the foregoing description taken in connection with the accompanying drawing it will be readily apparent to those skilled in the art to which an invention of this character appertains that I provide an improved method and apparatus for coining or forming metal units or objects from substantially plastic material which utilizes the otherwise discarded metal chips, and in which the objects are produced in finished form, thus obviating the major machining operations.

I claim:

1. In an apparatus of the character described, including a forming press having movable and stationary mold sections means to reduce metal to a plastic state, means to conduct said metal while in a plastic state to said mold, means yieldably maintaining the bottom of the stationary mold section in normal position whereby movement of the movable mold section to engagement with the stationary section closes the mold and carries said bottom and the plastic metal with it, and means for limiting the movement of said bottom whereby pressure is applied to the metal.

2. An apparatus for forming solid metal objects from metal in a granular form comprising a base, an open die mounted on the base, a movable bottom for said open die, spring means to retain the movable bottom in a predetermined raised position, a movable plunger mounted on the base for movement into and out of said open die, a crucible carried by the base above the open die and adapted to receive a quantity of metal in granular form to be reduced therein to a plastic state, means to conduct a quantity of granular metal in a plastic state by gravity into the open die, and pressure means to force the plunger down into the die to compress the quantity of granular metal into a homogeneous mass having the desired finished form, the movable bottom of the die being depressed during the forming of the metal and returning to its raised position to eject the finished object as the plunger is retracted.

HARRY A. SCHAUER.